Dec. 10, 1957  G. GREEN  2,815,945
VEHICLE SPRING ACCESSORY
Filed Dec. 13, 1955

INVENTOR.
GABRIEL GREEN
BY
*Harry Sangram*
ATTORNEY

United States Patent Office 2,815,945
Patented Dec. 10, 1957

2,815,945
VEHICLE SPRING ACCESSORY
Gabriel Green, Philadelphia, Pa.
Application December 13, 1955, Serial No. 552,843
1 Claim. (Cl. 267—45)

My invention relates to a vehicle spring, and more particularly relates to an accessory for automobile rear springs for accommodating additional loads.

In the manufacture of automobiles, it is common practice to utilize a pair of coil springs in the front of the automobile and a pair of leaf springs at its rear. Since the load on the front springs is almost completely dependent upon the weight of the engine, the coil spring ratio may be designed to resiliently support the automobile at a predictable value. However, the rear leaf springs support a rather variable load for most part because of the variation both in the number of passengers and the weight of the load in the trunk compartment. Since passenger comfort is of prime importance in an automobile, and the automobile's riding qualities are dependent upon the spring constant or ratio, the rear leaf springs are designed about the average load which may be expected. As a consequence, a very bouncy ride results when the driver is the only occupant, and a ride with extreme shocks is experienced when a heavy load is carried in the trunk and/or when a great number of passengers are in the rear seat. These heavy rear loads not only lend to rider discomfort when the rear springs "bottom," but also lead to early failure of the leaf springs themselves.

It is, therefore, an object of my invention to provide an accessory for the leaf springs of an automobile to supplement these springs for additional load carrying capacity.

Another object of my invention is to provide an automobile leaf spring accessory which will extend the life of the leaf springs and which may be incorporated upon any standard leaf spring assembly.

Another object of my invention is to provide a device which may be incorporated with the automobile leaf springs wherein a smooth riding quality is imparted over a wide range of passenger and trunk loads.

Another object of my invention is to provide a device for automobile leaf springs which will relieve "bottoming" shocks during travel along rough roads.

Oother objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing, in which.

Referring now in greater detail to the drawing, wherein similar reference characters refer to similar parts, I show an automobile leaf spring accessory, generally designated as A, which is adapted to be mounted as a supplement to an automobile leaf spring, generally designated as B.

Figure 1:
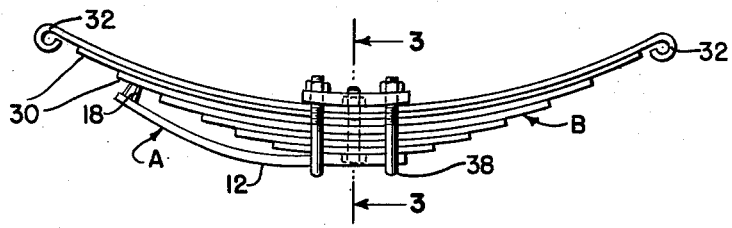
Fig. 1 is a side view of an automobile leaf spring utilizing a leaf spring accessory embodying my invention.
Figure 2:
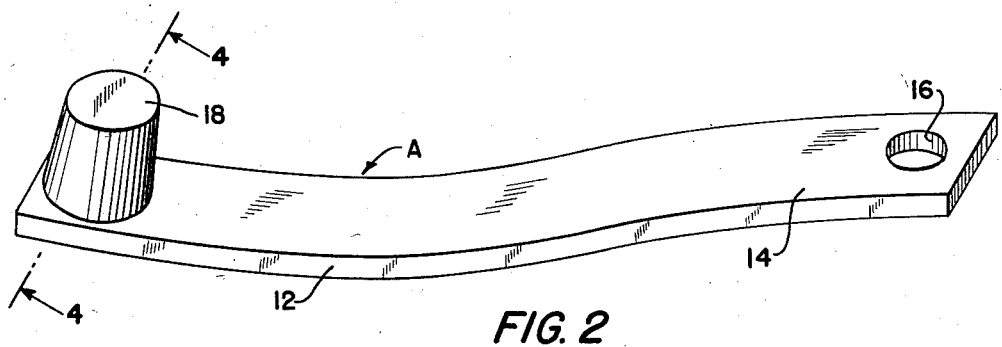
Fig. 2 is a perspective view of the leaf spring accessory.
Figure 3:
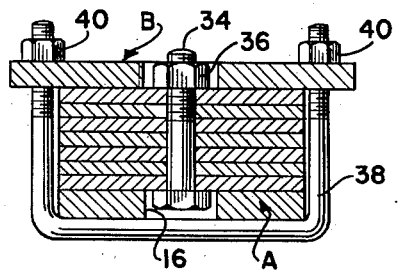
Fig. 3 is a sectional view taken along lines 3—3 of Fig. 1.
Figure 4:
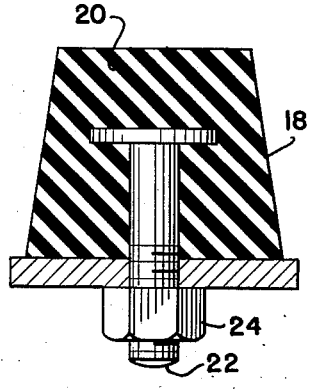
Fig. 4 is a sectional view taken along lines 4—4 of Fig. 2.

The leaf spring accessory A comprises an arcuate leaf 12 which is of an elastic material such as steel. The arcuate leaf 12 is bowed and has a flattened portion 14 adjacent one end, the flattened portion having a hole 16 which is adapted to overlie a nut or bolt which generally passes through the center portion of the assembled leaf spring as supplied by the manufacturer. The other end of the arcuate leaf 12 has a bumper or snubber 18 mounted thereon which is adapted to abut one of the leaves of the leaf assembly B. The bumper 18 comprises a rubber pad 20 which is molded about a stud bolt 22. As is seen in Fig. 4, the stud bolt 22 is passed through a hole in the arcuate leaf 12 and is secured thereto by a nut 24 to complete the spring accessory A.

The leaf spring B is of any conventional type used in automobiles or trucks and is made up of a plurality of leaves 30, each leaf being of diminishing length from top to bottom. The upper leaf has an eye 32 at each end which is shackled to the frame of the automobile. A bolt 34 passes through the center portion of each spring and maintains the leaves in longitudinal alignment and a nut 36 is tightened over the bolt. Lateral alignment of the leaves is accomplished by a pair of U-bolts 38 passing around the bottom leaf and the edges of all of the leaves.

In order to insert my accessory A upon the leaf spring assembly B, the U-bolts are removed from the latter, and the arcuate leaf 12 is set against the bottom leaf with the bumper abutting a leaf intermediate its center portion and end. It is to be noted that the hole 16 overlies the head of the bolt 34. Furthermore, it is generally desirable to have the accessory A positioned so that the bumper 18 is at the forward portion of the spring assembly B as mounted in the vehicle for optimum results. Finally, the U-bolts 38 are replaced about the bottom of the arcuate leaf 12 and edges of all the leaves wherein the accessory A becomes an integral part of the leaf spring itself.

As is evident from the drawing and description, the spring ratio will increase with greater load since greater reactance will be supplied by the accessory. In this manner, bottoming effects will be reduced, and the life of the springs themselves greatly increased.

Although my invention has been described in considerable detail, such description is intended as being illustrative rather than limiting, since the invention may be variously embodied, and the scope of the invention is to be determined as claimed.

I claim as my invention:

In combination with an automobile leaf spring, an accessory comprising an upwardly-concave arcuate leaf, a flat portion at one end of said leaf and being integrally formed thereon, and a snubber affixed to said arcuate leaf adjacent the other end and upwardly extending therefrom, said snubber consisting of a truncated conical rubber pad axially molded about a stud bolt, said stud bolt passing through an aperture in said arcuate leaf and being detachably secured thereto, said flat portion being secured to the bottom of said automobile leaf spring at the medial portion thereof, and said snubber abutting the bottom of said automobile leaf spring intermediate the front and medial portions thereof.

References Cited in the file of this patent
UNITED STATES PATENTS

| | | |
|---|---|---|
| 56,073 | Martin | July 3, 1866 |
| 1,538,188 | Hopper | May 19, 1925 |
| 1,621,962 | Stringer | Mar. 22, 1927 |
| 1,683,075 | Hughes | Sept. 4, 1928 |
| 1,789,514 | Center | Jan. 20, 1931 |
| 2,201,531 | Geb | May 21, 1940 |